United States Patent
He

(10) Patent No.: US 7,555,079 B2
(45) Date of Patent: Jun. 30, 2009

(54) METHOD AND CORRESPONDING ARRANGEMENT FOR DC OFFSET COMPENSATION USING CHANNEL ESTIMATION

(75) Inventor: Shousheng He, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 560 days.

(21) Appl. No.: 10/534,923

(22) PCT Filed: Oct. 9, 2003

(86) PCT No.: PCT/EP03/11224

§ 371 (c)(1), (2), (4) Date: Dec. 22, 2005

(87) PCT Pub. No.: WO2004/047388

PCT Pub. Date: Jun. 3, 2004

(65) Prior Publication Data

US 2006/0133547 A1 Jun. 22, 2006

Related U.S. Application Data

(60) Provisional application No. 60/429,618, filed on Nov. 26, 2002.

(30) Foreign Application Priority Data

Nov. 20, 2002 (EP) .................................. 02388073

(51) Int. Cl.
*H03D 1/04* (2006.01)
*H03D 1/06* (2006.01)

(52) U.S. Cl. ................. 375/349; 375/285; 375/316; 375/317; 375/319; 327/307

(58) Field of Classification Search ................. 375/147, 375/316–318, 346, 285, 319; 327/307
See application file for complete search history.

(56) References Cited

U.S. PATENT DOCUMENTS

| | | | |
|---|---|---|---|
| 6,370,205 B1 * | 4/2002 | Lindoff et al. ............. | 375/319 |
| 6,504,884 B1 * | 1/2003 | Zvonar ...................... | 375/346 |
| 6,606,314 B1 * | 8/2003 | Bahrenburg et al. ........ | 370/347 |
| 6,711,393 B1 * | 3/2004 | Stenstrom et al. ........... | 455/284 |
| 6,717,995 B2 * | 4/2004 | Zvonar ...................... | 375/340 |
| 6,901,121 B1 * | 5/2005 | Dubrovin et al. ........... | 375/346 |
| 7,058,144 B2 * | 6/2006 | Baldwin .................... | 375/346 |
| 7,317,767 B2 * | 1/2008 | Happonen et al. .......... | 375/319 |

FOREIGN PATENT DOCUMENTS

| | | |
|---|---|---|
| DE | 19606102 | 8/1997 |
| DE | 19606102 A1 * | 8/1997 |
| EP | 0954142 | 11/1999 |
| WO | WO-01/03396 | 1/2001 |
| WO | WO-01/31867 | 5/2001 |

* cited by examiner

OTHER PUBLICATIONS

Rolf Johansson; "System Modeling and Identification"; pp. 200-207; Prentice Hall, Englewood Cliffs, NJ 07632. 1993.

*Primary Examiner*—Mohammad H Ghayour
*Assistant Examiner*—Sophia Vlahos
(74) *Attorney, Agent, or Firm*—Michael Cameron

(57) ABSTRACT

A method of determining a DC offset in a communications signal received via a communications channel, the communications signal comprising a sequence of training symbols. The method comprises providing a channel estimate of the communications channel based on said sequence of training symbols; determining, based on the channel estimate, an estimate of a noise contribution introduced by the communications channel; and determining an estimate of the DC offset from the determined estimate of the noise contribution.

3 Claims, 2 Drawing Sheets

METHOD AND CORRESPONDING ARRANGEMENT FOR DC OFFSET COMPENSATION USING CHANNEL ESTIMATION

This patent application claims the benefit of priority from U.S. Provisional Patent Application Ser. No. 60/429,618 filed on Nov. 26, 2002. This application incorporates by reference the entire disclosure of U.S. Provisional Patent Application Ser. No. 60/429,618.

The present invention relates to the determination of a DC offset in a communications signal received via a communications channel. In particular, the invention relates to the determination of a DC offset in a communications signal received via a communications channel, the communications signal comprising a sequence of training symbols.

In a digital communications system, such as a system according to TDMA1, GSM, EDGE, or the like, data is encoded into symbols, packed into bursts and modulated prior to transmission via a physical transmission channel. At the receiver, the demodulation is performed and includes an equalizer which compensates for channel distortions, e.g. due to Inter-symbol interference (ISI).

For many communications system, in particular mobile telecommunications systems, the design of the receiver architectures is governed by requirements to be cost effective, small sized, and having low power consumption. Unfortunately, many such receiver architectures suffer from DC-offsets introduced in the communications system, in particular receivers, such as homodyne receivers, that directly convert the radio frequency signal into a baseband signal.

A DC offset may be introduced by a number of different sources, e.g. due to a local oscillator signal leaking to and reflecting off the antenna and being down converted to DC, due to a large near-channel interferer which is leaking into the local oscillator, due to a component mismatch in the signal path, or due to other reasons. Even though some of the above sources for DC offsets can be reduced to some extend by a careful front-end design, in many communications system a DC offset is still present at the baseband processing and may cause significant receiver performance degradation. Hence it is desirable to provide accurate estimates of DC offsets in order to allow for their compensation.

International patent application WO 01/03396 discloses a method of simultaneously estimating the transmission channel and the DC offset. According to this prior art method, the DC offset is treated as an extra tap in the multi-tap channel estimation.

It is a problem of the above prior art method that the simultaneous channel and DC offset estimation involves a significant computational complexity. It is a further problem that due to the extra tap an additional parameter is to be estimated, thereby compromising the quality of the channel estimation.

The above and other problems are solved by a method of determining a DC offset in a communications signal received via a communications channel, the communications signal comprising a sequence of training symbols; the method comprising providing a channel estimate of the communications channel based on said sequence of training symbols;

determining, based on the channel estimate, an estimate of a noise contribution introduced by the communications channel; and determining an estimate of the DC offset from the determined estimate of the noise contribution.

According to the invention, it has been realized that an estimation of the DC offset based on noise samples obtained from an initial channel estimate provides a considerably improved performance.

It has further been realized that the method according to the invention reduces the complexity of the processing.

The term DC-offset comprises low frequency distortion of the received signal. The term "low frequency distortion" in this context comprises distortions having a rate of change which, if any, is slow compared to the dynamics of the radio channel and the rate of the transmitted information (e. g., the low frequency distortion is relatively constant over the span of two transmitted symbols).

In a preferred embodiment of the invention, the step of determining the estimate of the noise contribution comprises determining the estimate of the noise contribution from a difference between a number of received training symbols and corresponding expected training symbols based on the determined channel estimate. Hence, an efficient noise estimate is provided.

In another preferred embodiment, the step of providing the channel estimate comprises treating a potential DC offset as an uncharacterized interference contribution, i.e. without considering the DC offset, thereby allowing a subsequent estimate of the DC offset based on the estimated noise.

In yet another preferred embodiment, the step of determining an estimate of the DC offset from the determined estimate of the noise contribution comprises calculating an inner product of a rotation trend vector and an estimated noise vector representing the determined estimate of the noise contribution. Hence, a computationally efficient estimation is provided that only requires n-m complex multiply and accumulate (MAC) operations where n is the number of training symbols and m is the size of the equalizer window and, thus related to the delay spread of the received radio signal. This is a significant reduction in complexity compared to the complexity of the joint channel-DC estimation of the above-mentioned prior art approach.

In another preferred embodiment, the step of determining the channel estimate comprises simultaneously determining a desired synchronization position of the sequence of training symbols with respect to a received signal burst of the communications signal and a desired size of an equalizer window of a channel estimation-based equalizer. It has further been realized by the inventor that a simultaneous estimation of the synchronization position and equalizer window size of the receiver may be performed which is robust against any DC offsets and, at the same time, yields an initial channel estimate which may advantageously be used in the DC offset determination according to the invention. Hence, by determining the synchronization position and equalizer span prior to the DC offset estimation, a channel estimate is provided by the synchronization and equalizer span adaptation without additional computational cost, thereby further decreasing the complexity of the DC offset compensation.

In a further preferred embodiment, the method further comprises determining a number of channel estimates of the transmission channel as a function of the synchronization position and a size of the equalizer window; determining the desired synchronization position and the desired size of the equalizer window by calculating an error measure based on the received signal burst and the determined estimates for a number of selected values of the synchronization position and of the size of the equalizer window.

It has been realized that the above method of burst synchronization and equalizer span sizing yields a burst synchronization which is robust against residual DC components after burst averaging.

In a yet further preferred embodiment, the step of determining the desired synchronization position and the desired size of the equalizer window by calculating an error measure based on the received signal burst and the determined estimates for a number of selected values of the synchronization position and of the size of the equalizer window comprises selecting the values of the size of the equalizer window between predetermined upper and lower bounds; and the method further comprises determining the upper and lower bounds based on at least a desired size of the equalizer window as determined for a previously received signal burst. Consequently, an adaptive aperture for the span adaptation is provided.

It has been realized that the physical channel in a digital communications system does not change instantly with respect to the delay spread in contrast to, for example, the strength and phase of a signal which may experience rapid fluctuations. Based on this understanding, the aperture of the equalizer span can be made adaptive, i.e. the aperture for a current span optimization may be determined based on the determined equalizer spans for one or more previous bursts.

In another preferred embodiment, the method further comprises averaging the received communications signal over a received signal burst, thereby providing a signal as an input to the initial channel estimation, where a considerable portion of the DC offset is removed. Consequently, the quality of the subsequent processing is further improved.

Preferably, the communications signal comprises a signal in accordance with the GSM specifications or in accordance with the EDGE specifications. EDGE (Enhanced Data rates for Global Evolution) is an interface mode which has recently been developed for GSM Networks. EDGE's principal features include new modulation and coding schemes which increase data capacity and speed in the air interface. EDGE is fully based on GSM and uses the same TDMA (Time Division Multiple Access) frame structure as GSM, such that it allows GSM operators to use existing GSM radio bands to offer wireless multimedia-based services and applications.

The present invention can be implemented in different ways including the method described above and in the following, an arrangement, and further methods and product means, each yielding one or more of the benefits and advantages described in connection with the first-mentioned method, and each having one or more preferred embodiments corresponding to the preferred embodiments described in connection with the first-mentioned method and disclosed in the dependant claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to a method of compensating a DC offset in a communications signal received via a communications channel, the communications signal comprising a sequence of training symbols; the method comprising determining a DC offset in the communications signal according to the method described above and in the following; and manipulating the communications signal to compensate for the determined DC offset.

In a preferred embodiment, the method further comprises
determining a channel estimate of the communications channel based on the manipulated communications signal;

filtering the manipulated communications signal in an equalizer based on the determined channel estimate.

The invention further relates to and arrangement for determining a DC offset in a communications signal received via a communications channel, the communications signal comprising a sequence of training symbols; the arrangement comprising processing means adapted to provide a channel estimate of the communications channel based on said sequence of training symbols;

processing means adapted to determine, based on the channel estimate, an estimate of a noise contribution introduced by the communications channel; and processing means adapted to determine an estimate of the DC offset from the determined estimate of the noise contribution.

The term processing means comprises any suitable general- or special-purpose programmable microprocessor, Digital Signal Processor (DSP), Application Specific Integrated Circuit (ASIC), Programmable Logic Array (PLA), Field Programmable Gate Array (FPGA), special purpose electronic circuit, etc., or a combination thereof.

The invention further relates to a receiver for receiving a communications signal via a transmission channel, the receiver comprising means for receiving a communications signal and an arrangement for determining a DC offset in the communications signal as described above and in the following.

The means for receiving a communications signal may include any device or circuitry suitable for receiving signal bursts of a communications scheme used in a digital communications system. Examples of such a receiver include a radio receiver, e.g. a radio receiver in a digital communications system according to GSM, EDGE, or the like.

The receiver may be part of an electronic equipment where the term electronic equipment includes all stationary and portable radio communication equipment and other handheld or portable devices. The term portable radio communication equipment includes all equipment such as mobile telephones, pagers, communicators, i.e. electronic organisers, smart phones, personal digital assistants (PDAs), handheld computers, or the like.

The above and further aspects of the invention will be described in more detail in connection with a preferred embodiment and with reference to the drawing in which FIG. 1 schematically illustrates a general model of a communications system;

Figure 1:
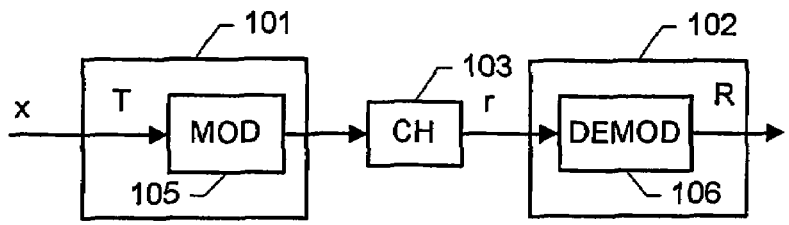

FIG. 1 schematically illustrates a general model of a communications system. The communications system comprises a transmitter 101 and a receiver 102 communicating via a communications channel 103. For example, in an actual implementation the transmitter may be a mobile terminal and the receiver a base station of a cellular radio frequency (RF) communications system or vice versa. The mobile terminal and the base station communicate with each other via communications signals transmitted over an air interface. For the purposes of the following description, the transmitter 101 is considered to comprise a modulator 105 which applies the necessary modulation to the signal so that it can be transmitted over the communications channel. The receiver comprises a demodulator 106 implementing a demodulation process corresponding to the modulation process implemented by the modulator 105, thereby allowing to recover the originally transmitted information from the received signal.

For the purpose of the present description, the modulation and demodulation processes mentioned above can be thought of as introducing a DC offset and a phase shift. The magnitude of the DC offset is unknown and causes problems in subsequent DSP processing steps on the received signal, if it is not removed. The phase shift depends on the modulation method used and is known. Each signal symbol is modulated prior to transmission and experiences a phase shift depending on the modulation technique used. This phase shift is also known as rotation and may be represented as a rotation by an angle $\alpha$, i.e. by a factor $\exp(j\,\alpha)$ where j is the complex indicator.

For example, in EDGE the selected modulation is $3\pi/8$-8PSK. In the basic 8PSK constellation there are 8 equidistant points on the unit circle. This means that the transmitted symbols $x_k$ can assume eight possible values, $x_k = \exp(j \cdot i \cdot \pi/4)$ where $i=0, \ldots, 7$ depending on the symbol value, i.e. the bit sequence to be communicated. Now for $3\pi/8$-8PSK, the $3 \cdot \pi/8$ shift means that the transmitted symbols are multiplied by a $3\pi/8$ rotating value yielding $x'_k = x_k \cdot \exp(j \cdot k \cdot 3 \cdot \pi/8)$, where k is the symbol index.

At the receiver, the received symbols are de-rotated accordingly by an angle $-\alpha$. For example, in EDGE, the symbols are de-rotated by $\exp(-j \cdot k \cdot 3 \cdot \pi/8)$ to get the original 8PSK constellation to be equalised. However, this de-rotation will also make any DC offset which may exist in the signal rotate by $\exp(-j \cdot k \cdot 3 \cdot \pi/8)$, thereby causing an additive rotating trend in the received signal.

Figure 2:
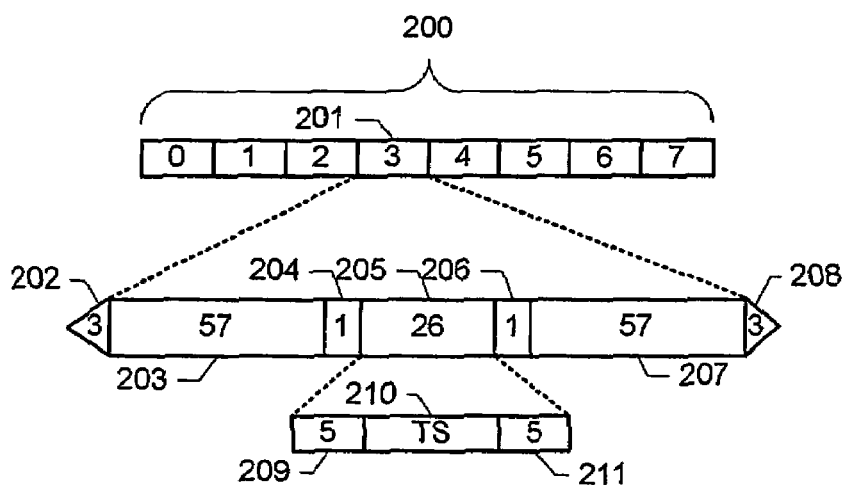
FIG. 2 illustrates the structure of a TDMA frame used in a digital communications system according to the GSM/EDGE standard.

FIG. 2 schematically illustrates the structure of a TDMA frame 200 used in a mobile telecommunications system according to the GSM standard. For a TDMA system according to the GSM standard, mobile stations transmit bursts as modulated signals on respective carrier frequencies according to channels allocated to respective calls by a base station controller. One frequency channel may support up to eight calls, each call being associated with a respective burst, where each call is allocated a time slot in a TDMA frame in which to send the burst. In FIG. 2, frame 200 has a duration of 4.615 ms and accommodates 8 information channels (time slots) 201, designated 0-7 in FIG. 2. Each of the 8 time slots has a duration of 0.577 ms and contains a 148-bit signal portion and a guard portion (not shown) which functions to maintain separation between signals in adjacent time slots. The 148-bit signal portion is generally referred to as a normal burst and comprises a first 3-bit tail bit section 202, a first 57-bit coded data section 203, a first 1-bit housekeeping bit section 204, a 26-bit trailing sequence section 205, a second 1-bit housekeeping bit section 206, a second 57-bit coded data section 207 and a second 3-bit tail bit section 208. The 26-bits comprising the training sequence section 205 in a GSM digital communications system, is typically viewed as being divided into a centrally located portion 210 of 16-bits (sometimes referred to as the mid-amble portion), and side portions 209 and 211 of 5-bits each. Alternatively, in a GSM/EDGE digital communications system, the 26-bit training sequence 205 can be also viewed as including a 16-bit white sequence and a 10-bit cyclic prefix. Further details of a TDMA system according to the GSM standard are not described herein because they are known to a person skilled in the art.

It is noted that, alternatively, other burst structures providing a suitable sequence of training symbols may be used.

In digital communications systems, inter-symbol interference can occur as a result of time dispersion in the transmission channel over which a signal is transmitted. In GSM/EDGE systems, the usual way to compensate for ISI is to provide a channel estimation based equalizer in the receiver. A correct burst synchronization is essential to the performance of the equalizer.

Figure 3:
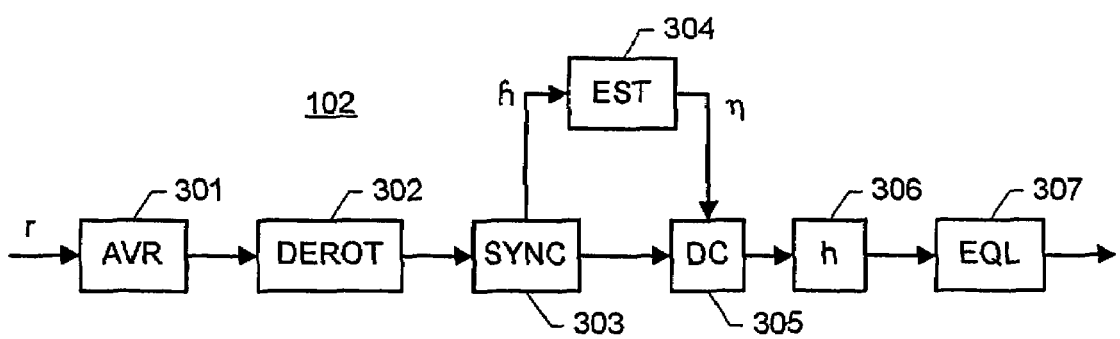
FIG. 3 shows a schematic block diagram of a receiver according to an embodiment of the invention.

FIG. 3 shows a schematic block diagram of a receiver according to an embodiment of the invention. The receiver 102 comprises an averaging block 301, a de-rotation block 302, a synchronization and span adaptation block 303, a trend estimation block 304, a DC correction block 305, a channel estimator 306, and an equalizer 307.

The averaging block 301 receives the received signal and performs an averaging of the received signal over a burst, and removes any DC offset identified by the averaging. However, typically this simple approach does not remove the entire DC but leaves a residual DC offset.

The de-rotating block 302 de-rotates the received symbols by a predetermined angle according to the modulation scheme used and as was described in connection with FIG. 1.

The synchronization block 303 identifies the portion of the received signal that corresponds to the training sequence: As mentioned above, the signals are transmitted in bursts. At the receiver, the shape of a received burst is the result of the transmitted burst and the distortions introduced by the transmission channel, such as noise, multi-path propagation, etc. The task of burst synchronization involves the task of determining a suitable position p of the training sequence within the received burst.

In one embodiment, this may be achieved by setting the equalizer window size m to a predetermined value and by performing burst synchronization using a Least-Squares Error (LSE) method. This approach requires an initial channel estimation $\hat{h}_p$ for each possible synchronization position p. The desired synchronization position is then determined by minimizing a square error according to $$p = \mathrm{argmin}\left(\sum_k |r(k) - \hat{r}_p(k)|^2\right),$$

where $$\hat{r}_p(k) = \sum_{i=0}^{m-1} h_p(m-1-i) \cdot t(k+1)$$

is an estimate of the received symbol based on the initial channel estimate $\hat{h}_p$.

In a preferred embodiment of the invention, the burst synchronization is combined with an optimization of the window size m of the equalizer, as will be described in greater detail below.

The trend estimation block 304 identifies any residual rotation trend caused by a residual DC offset not eliminated by the averaging block 301. The trend estimation block 304 receives the initial channel estimate from the synchronization block 303 and determines the residual rotation trend, as will be described in greater detail below.

The DC offset corrector 305 receives the estimated rotation trend from the trend estimation block 304 and corrects the baseband signal for the detected offset prior to feeding the signal into the channel estimator 306 and the equalizer 307.

The equalizer 307, e.g. a Viterbi equalizer, compensates for the channel effects and demodulates the relevant portions of the received baseband signal that corresponds to the received data. The transmission characteristics of the transmission channel frequently change due to a variety of factors, including the motion of the mobile terminals, the fluctuation of multi-path (time dispersive) propagation channels and variant interferences introducing noise. As is well-known to those skilled in the art, the multipath channel and the noise component can adversely affect the quality of the received signal, e.g., cause intersymbol interference; and this necessitates that the received signal be corrected, typically by means of channel estimation-based equalizer.

Specifically, the equalizer 307 attempts to correct the received signal utilizing an estimate of the transmission channel. The equalizer 307 generates data representing an estimate of the actual transmitted symbols for further processing by the receiver.

The receiver further comprises a channel estimator 306 which computes a number of filter taps $h_i$, $i=1, \ldots, m$ corresponding to the selected window size m of the equalizer. The channel estimate generated by the channel estimator 306 is fed into the equalizer 307.

Figure 4:
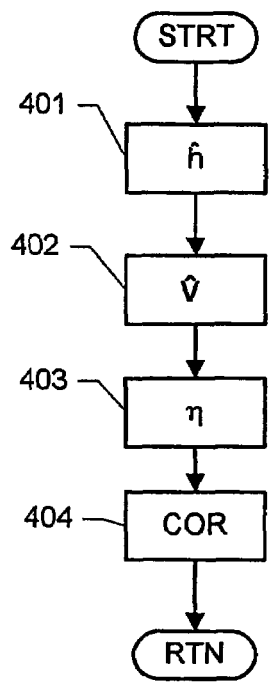
FIG. 4 shows a flow diagram of a DC offset determination according to an embodiment of the invention.

FIG. 4 shows a flow diagram of a DC offset determination according to an embodiment of the invention.

In order to describe the trend estimation block in greater detail, we consider a signal burst comprising a training sequence $$t=[t_0 t_1 \ldots t_{n-1}]^T$$

of length n that is sent from the transmitter 101 to the receiver 102. In the receiver 102, the signal is fed into the averaging block 301, the de-rotating block 302 and the synchronization block 303 as described in connection with FIG. 3. The resulting de-rotated signal after burst synchronization can be modeled as a vector in baseband according to $$r=[r_0 r_1 \ldots r_{n-m}]^T = \Phi h + \eta q + v.$$

Hence, r comprises a contribution from the transmission channel which is a function of the channel vector $$h=[h_0 h_1 \ldots h_{m-1}]^T$$

and a regression matrix $$\Phi = \begin{bmatrix} t_{m-1} & t_{m-2} & \cdots & t_1 & t_0 \\ t_m & t_{m-1} & \cdots & t_2 & t_1 \\ \vdots & \vdots & \ddots & \vdots & \vdots \\ t_{n-2} & t_{n-3} & \cdots & t_{n-m} & t_{n-m-1} \\ t_{n-1} & t_{n-2} & \cdots & t_{n-m+1} & t_{n-m} \end{bmatrix}.$$

Here, m is the channel span corresponding to the delay spread of the propagation channel in terms of symbols. The above expression for r further comprises a rotating trend contribution which is caused by a DC off-set in the received signal which is transformed into a rotating trend by the de-roation of block 302. The rotating trend is modeled as a rotation trend vector $$q=[1 e^{-j\alpha} e^{-j2\alpha} \ldots e^{-j(n-m-1)\alpha}]$$

multiplied by the amplitude $\eta$ of the residual DC offset. Here, $\alpha$ denotes the rotation increment which depends on the modulation method used as described above. For example, in GSM $\alpha=\pi/2$ while in EDGE $\alpha=3\pi/8$.

Finally, the above expression for r comprises a noise vector $$v=[v_0 v_1 \ldots v_{n-m}]^T.$$

According to the invention, in order to compensate for the DC offset, initially, in step 401 an initial LSE channel estimate $$\hat{h}=(\Phi^* \Phi)^{-1} \Phi^* r$$

is provided without considering the residual DC offset, i.e. by treating the DC offset as an uncharacteristic interference contribution. Here $(\ldots)^*$ denotes complex conjugate transposition. In the case of real training sequences, as in GSM and EDGE, this reduces to plain transposition.

In step 402, the corresponding initial estimation of the noise samples is calculated according to $$\hat{v}=r-\Phi \hat{h}.$$

In a preferred embodiment of the invention, step 401 comprises a joint optimization of the synchronization position and the equalizer span adaptation as described below. The resulting synchronization is robust against a residual DC offset, i.e. it is not critically influenced by the presence of any DC offset.

For such a channel estimate which is robust against residual DC, the noise samples can be considered as a function of the rotating trend, according to $$\hat{v}=r-\Phi \hat{h}=\eta q+v',$$

where v' represents errors due to inaccuracies in the estimation.

Hence, from the calculated noise samples, in step 403 a Least Square (LS) estimate of the rotation trend is derived according to $$\eta = (q*q)^{-1} q * \hat{v} = \frac{q * \hat{v}}{n-m+1}.$$

Here, the second identity is due to the fact that the rotation vector is of unit length, thereby yielding a simple number as the inverse of the inner product of the rotation vector. Hence, in step 403 the magnitude $\eta$ of the DC offset is calculated as a scaled inner product of the rotation trend vector q and the initial estimate $\hat{v}$ of the noise samples.

Finally, the resulting complex number $\eta$ indicative of the rotating trend due to the DC offset, is used in the final step 404 to correct for the residual DC offset, i.e. by subtracting the term $\eta q$ from the received signal and feeding the resulting DC corrected signal $$r'=r-\eta q$$

into the final channel estimator, i.e. the channel estimator 306 of FIG. 3.

It is noted that the above estimation of the DC offset only requires n-m complex MAC operations which is a significant reduction in complexity compared to the complexity of the joint channel-DC estimation of the above-mentioned prior art approach.

Figure 5:
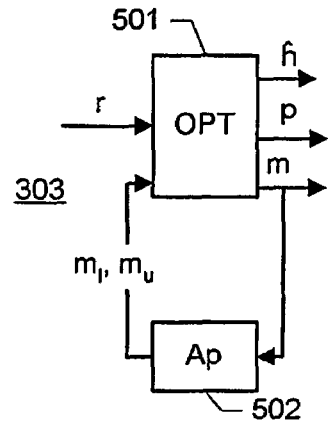
FIG. 5 shows a schematic block diagram of the joint synchronization and equalizer span adaptation.

FIG. 5 shows a schematic block diagram of the joint synchronization and equalizer span adaptation.

As mentioned above, in a preferred embodiment of the invention, the receiver comprises a joint synchronization and span adaptation module 303 which performs a joint determination of a synchronization position p and a size m of the equalizer window.

The joint synchronization and span adaptation module 303 comprises an optimization module 501 for the joint optimization of the equalizer span and the synchronization position within a predetermined interval of window sizes. Accordingly, the synchronization and span adaptation module 303 further comprises an aperture module 502 which determines an upper and a lower bound $m_u$ and $m_l$, respectively, of the window size to be used by the optimization module for the synchronization of the subsequent burst. The aperture module 502 receives the determined window size m for a current burst from the optimization module 501 and feeds resulting bounds for the next burst back to the optimisation module 501.

Figure 6:
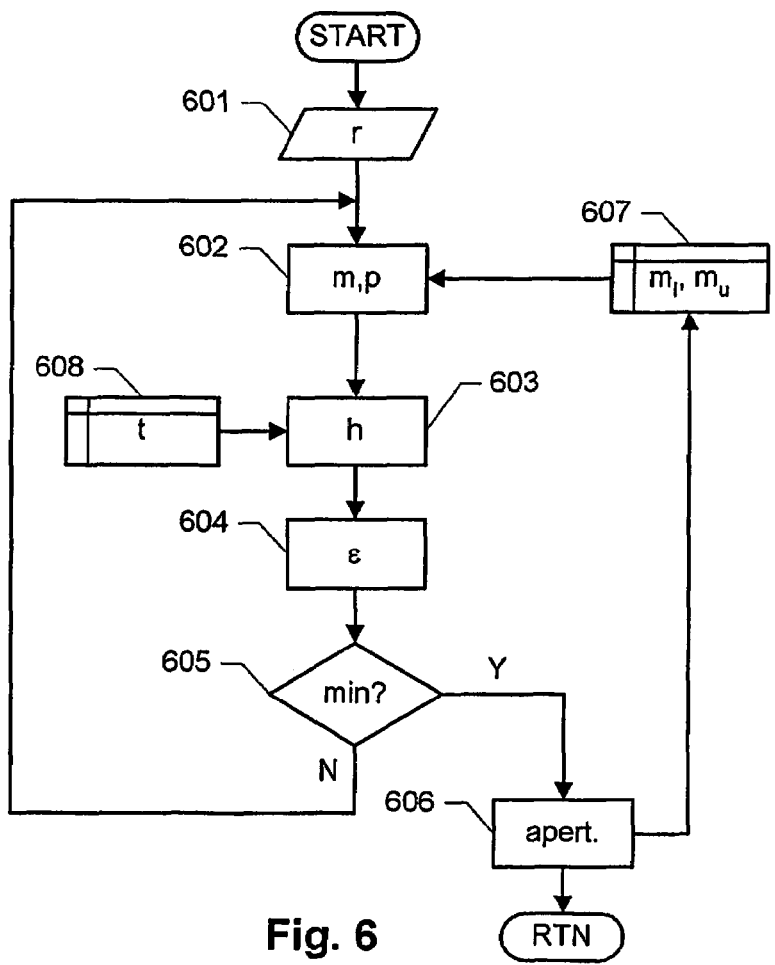
FIG. 6 shows a flow diagram of burst synchronization and span adaptation according to a preferred embodiment of the invention.

FIG. 6 shows a flow diagram of burst synchronization and span adaptation according to a preferred embodiment of the invention.

The embodiment of FIG. 6 provides an efficient channel estimation method by recognizing and utilizing two previously unexploited properties of GSM/EDGE training sequences which arise from the cyclic prefix structure of the training sequences. In particular, this embodiment recognizes that the 26-symbol GSM/EDGE training sequences are, within certain ranges, both shift invariant and order invariant. The property of being shift invariant enables a channel estimation to be carried out with delayed (shifted) training sequence segments. This, in turn, permits: I. The ISI corrupted leading training sequence symbols to be avoided as much as possible in long dispersive channels; and II. The leading taps of a channel to be estimated using the same training sequence segments, regardless of the size of the equalizer window. The property of being order invariant permits channels with different time dispersion, from 1-8 symbols (as complex polynomials of 1-8th order) to be estimated without matrix inversion if any consecutive 16-symbol segment of the training sequence is used.

In particular, upon receipt of a signal burst r(k) in step 601, a Least Square Error algorithm is performed to determine the equalizer window span m and the synchronization position p as illustrated by the loop comprising steps 602-605.

According to this embodiment, the equalizer window span m and the synchronization position p are determined as $$(p, m)_{opt} = \underset{p,m}{\operatorname{argmin}}(\varepsilon^2(p, m)) = \underset{p,m}{\operatorname{argmin}}(\alpha^m \cdot e^2(p, m)), \quad (1)$$

$$p = 0, 1, \ldots, w-1$$

$$m = m_l, \ldots, m_u$$

where $\epsilon(p,m) = \alpha^{m/2} \cdot e(p,m)$ is a generalized error measure derived from the error function $$e(p, m) = \sqrt{\sum_k |r(k) - \hat{r}_{p,m}(k)|^2}.$$

Here $$\hat{r}_{p,m}(k) = \sum_{i=0}^{m-1} \hat{h}_{p,m}(m-1-i) \cdot t(k+1)$$

is an estimate of the received signal expressed as a function of m and p, i.e. e(p,m) is a measure of the noise power introduced by the estimated transmission channel $\hat{h}_{p,m}$ on the training sequence t. It is noted that, in a practical implementation, the square root in the above definition of the error function e(p,m) may be omitted, i.e. the square of the error may be used instead.

If the noise power is used directly as an error function for optimization, the channel window size m tends to be larger than necessary. This is because the additional parameters of a larger filter could adjust themselves to particular features of the specific realization of the noise, i.e. the phenomenon sometimes referred to as overfitting. To avoid this, a penalty factor $\alpha^m$ is introduced according to the Minimum Description Length Principle (MDL) (see e.g. R. Johansson, "System Modeling and Identification", Prentice Hall, 1993). The penalty factor penalizes large equalizer spans m, and therefore suppresses the effect of overfitting. In a preferred embodiment, the factor α is determined by the length n of the training sequence $\alpha = n^{1/n}$. Hence, in the example of a 16-symbol training sequence α=1.189. It is noted, however, that alternatively other functions penalizing large window spans may be used.

The optimization of eqn. (1) is performed both for p and m, where m is varied in an interval between the upper and lower bounds $m_u$ and $m_l$, respectively, as will be described in greater detail below.

Still referring to FIG. 6, the optimization loop thus comprises the following steps:

Step 602: Select a pair of values (p,m) within the intervals indicated in eqn. (1).

Step 603: Estimate the transmission channel $\hat{h}_{p,m}$ for the selected values of p and m based on the stored training sequence t (608). When an LSE approach is used for joint synchronization and equalizer window sizing, for a hypothetical sync position p and an equalizer window size m, channel estimation can be computed as $$h = \Phi^{-1} t^* r = (1/16) t^* r.$$

With the exception of the constant factor, it can be further expressed in an explicit convolution form, $$\hat{h}_{p,m}(k) = \sum_i t(m+i-k) \cdot r(p+m-i), \quad (4)$$

$$0 \leq p \leq w$$

$$0 \leq k \leq m$$

This can be considered as a FIR-style computation. For the next tap with k+1, a recurrent relation can be established:

$$\hat{h}_{p,m}(k+1) = \hat{h}_{p+1,m}(k) + t(m-1-k) \cdot r(p+m) - t(m+(n-1)-k) \cdot r(p+m+n). \quad (5)$$

By using this two-dimensional (sync-point tap-position) recursive relation in an IIR-style computation, a new tap can be calculated using only 4 real MAC operations (since the training sequences are real).

Step 604: Calculate the generalized error $\epsilon^2(p,m)$. It is noted that, for 16-symbol GSM training sequences and with m<8, the generalized error $\epsilon^2(p,m)$ may be expressed as $$\epsilon^2(p,m)=\alpha^m(|r|^2-16\hat{h}_{p,m}|^2), \epsilon^2>0.$$

Hence, in this case, the error measure $\epsilon^2(p,m)$ may be efficiently calculated as the difference of the received signal power $|r|^2$ and the scaled power of the estimated channel taps $16 \cdot |\hat{h}_{p,m}|^2$, i.e. without the need for calculating the actual noise. It is noted, that the constraint $\epsilon^2>0$ is explicitly enforced, since the expression $|r|^2-16|\hat{h}_{p,m}|^2$ may become negative at incorrect synchronization positions. Hence, when $16|\hat{h}_{p,m}|^2 \geq |r|^2$ no further calculation is necessary and the hypothetical synchronization position is rejected immediately, since the constraint is not met.

Step 605: Repeat the above steps until a suitable minimum is found. In one embodiment, the error is calculated for all possible pairs (p,m) within the above intervals, and the minimum of all calculated values is determined as the optimal set of values $(p,m)_{opt}$.

When the optimal set of values $(p,m)_{opt}$ is determined, in step 606 the aperture for the span optimization of the subsequent burst, i.e. the upper and lower bounds $m_u$ and $m_l$, is determined and stored (607) for use in the subsequent optimization. According to this embodiment, an adaptive aperture is achieved by use of a simple auto regressive (AR) filter with one state $m_s$ that is updated at each burst:

$$m_s(t)=a \cdot m_s(t-1)+b \cdot m(t),$$

where m(t) is the current equalizer span determined by the above optimization. Hence, the state $m_s(t)$ corresponds to a weighted mean of the previously determined equalizer spans, where the spans determined for the most recent bursts are weighted strongest. A suitable initial value is assumed, e.g. $m_s(t=1)=m(t-1)=(m_{min}+m_{max})/2$. The relative weights are determined by the parameters a and b. Preferably a and b are selected in the interval [0,1], preferably such that a>b, e.g. $a \in [0.8,0.9]$ and $b \in [0.1,0.2]$, for example a=0.875 and b=0.125. Larger values of a reduce the relative influence of the most recent changes and vice versa, i.e. preferably the

What is claimed is:

1. A method of determining a DC offset in a communications signal received via a communications channel, the communications signal comprising a sequence of training symbols; the method comprising;
   providing a channel estimate of the communications channel based on said sequence of training symbols;
   determining, based on the channel estimate, an estimate of a noise contribution introduced by the communications channel; and
   determining an estimate of the DC offset from the determined estimate of the noise contribution, wherein the step of determining an estimate of the DC offset from the determined estimate of the noise contribution comprises calculating an inner product of a rotation trend vector and an estimated noise vector representing the determined estimate of the noise contribution.

2. An arrangement for determining a DC offset in a communications signal received via a communications channel, the communications signal comprising a sequence of training symbols; the arrangement comprising;
   processing means adapted to provide a channel estimate of the communications channel based on said sequence of training symbols;
   processing means adapted to determine, based on the channel estimate, an estimate of a noise contribution introduced by the communications channel; and
   processing means adapted to determine an estimate of the DC offset from the determined estimate of the noise contribution, wherein the processing means adapted to determine an estimate of the DC offset from the determined estimate of the noise contribution calculates an inner product of a rotation trend vector and an estimated noise vector representing the determined estimate of the noise contribution.

3. The arrangement of claim 2, implemented in a receiver for receiving a communications signal via a transmission channel.

* * * * *

UNITED STATES PATENT AND TRADEMARK OFFICE
CERTIFICATE OF CORRECTION

PATENT NO. : 7,555,079 B2
APPLICATION NO. : 10/534923
DATED : June 30, 2009
INVENTOR(S) : He It is certified that error appears in the above-identified patent and that said Letters Patent is hereby corrected as shown below:

On the Title Page, in Item (56), under "FOREIGN PATENT DOCUMENTS", in Column 2, Line 1, delete "DE   19606102   8/1997".

In Column 8, Line 2, delete "roation" and insert -- rotation --, therefor.

In Column 11, Line 4, delete " $\epsilon^2(p,m) = \alpha^m(|r|^2 - 16 h_{p,m}|^2), \epsilon^2 > 0.$ " and insert -- $\epsilon^2(p,m) = \alpha^m(|r|^2 - 16|h_{p,m}|^2), \epsilon^2 > 0.$ --, therefor.

In Column 11, Line 38, delete "a∈=[O.8,0.9]" and insert -- a∈=[0.8,0.9] --, therefor.

In Column 11, Line 40, after "preferably the" insert -- parameters a and b are selected according to the time scale of the variation in the delay spread.
   The aperture of the equalizer span optimization is then determined as:
      $m_l$ = round($m_s$(t-1)) - A, $m_l \geq m_{min}$
      $m_u$ = round($m_s$(t-1)) + B, $m_{max} \geq m_u$,
i.e. $m_l$ and $m_u$ are lower and upper bounds, respectively, of an interval around $m_s$. The constants A and B determine the width of the aperture. For example, A=B=1 yields an aperture that is 2-3 taps wide.
   The constant upper and lower limits $m_{max}$ and $m_{min}$ ensure that $m_l$ and $m_u$ lie within desired limits, e.g. $m_{min}$ = 4 corresponding to typical urban (TU), and $m_{max}$ = 8 corresponding to hilly terrain (HT).
   This embodiment has the advantage that no assumption has to be made about the precise channel delay spread, thereby improving the performance of the synchronization and the subsequent equalization.
   It is a further advantage of this embodiment that the channel estimate provided by this synchronization method is robust against DC offsets, thereby providing a good input for the DC offset estimation.
   It is noted that in connection with an EDGE receiver, it is preferred to combine the receiver filter with a noise whitening filter in order to suppress interferences and, thus, to avoid the necessity of a narrow receiver filter.

UNITED STATES PATENT AND TRADEMARK OFFICE
CERTIFICATE OF CORRECTION

PATENT NO. : 7,555,079 B2
APPLICATION NO. : 10/534923
DATED : June 30, 2009
INVENTOR(S) : He It is certified that error appears in the above-identified patent and that said Letters Patent is hereby corrected as shown below:

The invention has primarily been described in connection with GSM/EDGE training symbols. However, the invention is not limited to GSM/EDGE, but may be applied to signal bursts of other communications schemes which utilize suitable training sequences for burst synchronization. --.

Signed and Sealed this

Twenty-fourth Day of November, 2009

David J. Kappos
*Director of the United States Patent and Trademark Office*